(12) United States Patent
Edelson

(10) Patent No.: US 7,075,265 B2
(45) Date of Patent: Jul. 11, 2006

(54) HIGH PHASE ORDER ELECTRICAL ROTATING MACHINE WITH DISTRIBUTED WINDINGS

(75) Inventor: Jonathan Sidney Edelson, Sommerville, MA (US)

(73) Assignee: Borealis Technical Limited (GI)

(*) Notice: Subject to any disclaimer, the term of this patent is extended or adjusted under 35 U.S.C. 154(b) by 0 days.

(21) Appl. No.: 10/509,777

(22) PCT Filed: Apr. 3, 2003

(86) PCT No.: PCT/US03/10346

§ 371 (c)(1),
(2), (4) Date: Sep. 29, 2004

(87) PCT Pub. No.: WO03/085801

PCT Pub. Date: Oct. 16, 2003

(65) Prior Publication Data

US 2005/0218863 A1   Oct. 6, 2005

Related U.S. Application Data

(60) Provisional application No. 60/370,484, filed on Apr. 3, 2002.

(51) Int. Cl.
*H02P 21/04* (2006.01)
*H02P 27/00* (2006.01)

(52) U.S. Cl. .............. 318/801; 318/807; 318/737

(58) Field of Classification Search .......... 318/801, 318/807, 808, 773, 737; 310/184, 68 R; 363/40
See application file for complete search history.

(56) References Cited

U.S. PATENT DOCUMENTS

| | | | |
|---|---|---|---|
| 3,387,205 A | 6/1968 | Tesdall | |
| 3,663,877 A | 5/1972 | Clark | |
| 3,688,171 A | 8/1972 | Salihi et al. | |
| 3,815,002 A | 6/1974 | Clemente et al | |
| 3,876,923 A | 4/1975 | Humphrey et al. | |
| 3,903,469 A * | 9/1975 | Ravas | 363/40 |
| 3,991,352 A | 11/1976 | Fry et al. | |
| 3,995,203 A | 11/1976 | Torok | |
| 4,146,804 A | 3/1979 | Carr, Jr. | |
| 4,319,176 A | 3/1982 | Akamatsu | |
| 4,321,518 A | 3/1982 | Akamatsu | |
| 4,445,080 A * | 4/1984 | Curtiss | 318/798 |
| 4,527,120 A * | 7/1985 | Kurosawa | 324/166 |
| 4,678,974 A | 7/1987 | Guastadini | |
| 4,751,448 A * | 6/1988 | Auinger | 318/773 |
| 4,928,051 A | 5/1990 | Demeter et al. | |
| 4,996,470 A | 2/1991 | Rowan et al. | |
| 5,019,766 A * | 5/1991 | Hsu et al. | 318/807 |
| 5,053,689 A * | 10/1991 | Woodson et al. | 318/705 |
| 5,189,357 A * | 2/1993 | Woodson et al. | 318/737 |
| 5,559,419 A * | 9/1996 | Jansen et al. | 318/808 |
| 5,565,752 A * | 10/1996 | Jansen et al. | 318/807 |
| 5,585,709 A * | 12/1996 | Jansen et al. | 318/807 |
| 5,661,379 A | 8/1997 | Johnson | |
| 5,710,509 A * | 1/1998 | Goto et al. | 324/207.25 |
| 5,757,182 A | 5/1998 | Kttazawa | |

(Continued)

*Primary Examiner*—Paul Ip

(57) ABSTRACT

A rotating induction machine, containing five or more different phases, having windings distributed according to a sinc function with a cutoff frequency allowing low-order spatial harmonics but preventing higher order spatial harmonics from flowing. In a preferred embodiment, the machine is connected to drive means capable of injecting third harmonic into the machine. In a further preferred embodiment, the windings are connected to the drive means with a mesh connection and the machine has five phases.

21 Claims, 10 Drawing Sheets

U.S. PATENT DOCUMENTS

| | | |
|---|---|---|
| 5,786,673 A | 7/1998 | Johnson |
| 5,821,656 A | 10/1998 | Colby et al. |
| 6,054,837 A | 4/2000 | Edelson |
| 6,064,172 A | 5/2000 | Kuznetsov |
| 6,078,119 A * | 6/2000 | Satoh et al. ............... 310/90.5 |
| 6,153,953 A | 11/2000 | Isozaki et al. |
| 6,175,272 B1 | 1/2001 | Takita |
| 6,198,238 B1 | 3/2001 | Edelson |
| 6,208,537 B1 * | 3/2001 | Skibinski et al. ............. 363/40 |
| 6,348,775 B1 | 2/2002 | Edelson |
| 6,351,095 B1 | 2/2002 | Edelson |
| 6,657,334 B1 * | 12/2003 | Edelson ..................... 310/68 R |
| 6,710,495 B1 * | 3/2004 | Lipo et al. .................. 310/184 |
| 6,853,105 B1 * | 2/2005 | Nakano et al. ........ 310/156.47 |
| 6,876,116 B1 * | 4/2005 | Nakano et al. ........ 310/156.47 |
| 2003/0048017 A1 * | 3/2003 | Nakano et al. .............. 310/152 |
| 2005/0057212 A1 * | 3/2005 | Harbaugh et al. ........... 318/809 |

* cited by examiner

HIGH PHASE ORDER ELECTRICAL ROTATING MACHINE WITH DISTRIBUTED WINDINGS

CROSS-REFERENCE TO RELATED APPLICATION

This application is the U.S. national stage application of International Application PCT/US03/10346, filed Apr. 3, 2003, which international application was published on Oct. 16, 2003, as International Publication WO03085801 in the English language. The International Application claims the benefit of U.S. Provisional Application No. 60/370,484, filed Apr. 3, 2002. The above-mentioned patent applications are assigned to the assignee of the present application and are herein incorporated in their entirety by reference.

TECHNICAL FIELD

The present invention relates to winding distributions in rotating electrical machines.

BACKGROUND ART

Previously disclosed, in U.S. Pat. Nos. 6,570,361 and 6,351,095, have been High Phase Order electrical rotating machine designs. Of specific interest is the application "HIGH PHASE ORDER MOTOR WITH MESH CONNECTED WINDINGS," Ser. No. 09/713,654, filed Nov. 15, 2000, now U.S. Pat. No. 6,657,334, which discloses the use of a high phase order concentrated winding machine, connected to an inverter using a mesh connection. When using a mesh connection, the voltage across each winding is a function related to the voltages of both of the two inverter legs that drive that winding, and therefore, may be different from the actual voltages produced by the inverter legs. That machine is deliberately operated either with a fundamental drive waveform, a pure harmonic drive waveform, or admixtures of these, in order to change the volts/hertz ratio of an induction machine, in order to increase the power delivered to the machine by a power electronics drive system when the motor was being operated at low speed and thus reduced slot voltage. In other words, the motor can be operated at higher current than the currents produced in the inverter.

In my previously disclosed machines, extensive use was made of concentrated windings. Concentrated windings place inductors of a single phase in a single slot in each pole of a stator. Motor windings are usually produced using coils of wire, with the portion of a coil residing in one slot forming the inductors for that slot, and the portion of the same coil on the opposite side of the coil is placed in another slot, forming a set of inductors with reverse polarity from the first. These two slots are placed 180 electrical degrees apart, forming so-called full span concentrated windings.

Concentrated windings offer numerous benefits, including the ability to use harmonic components of drive currents to produce useable rotating fields, reduction in chording and distribution factors, which reduce resistance losses, and the ability to use specific harmonic drive waveforms to obtain desired changes in machine impedance. However the use of concentrated windings comes at a significant cost. Each phase in a concentrated winding machine requires separate input terminals, separate inverter output stages, separate wiring and fault detection circuitry, separate logic level PWM, and possibly separate current and voltage measurement. Additionally, if the phase count is not sufficient, then a concentrated winding electrical machine does not make sufficient use of its stator. The stator slots would be few and widely spaced. Concentrated winding induction machines are thus only useful when the phase count can be large.

The standard of industry for electrical rotating machines is the three-phase system. Three phase systems cannot in general use concentrated windings, with the exception of extremely high pole count systems, in which the pole/phase group (PPG) might be limited to a single slot. Rather, three phase systems use distributed and chorded windings in order to make better use of the stator, and to eliminate the deleterious results caused by non-synchronized components in the drive waveform, winding flux distribution, or other sources of spatial harmonic magnetic fields.

In a stator with distributed windings, the series connected inductors of a single phase are placed in a number of slots rather than in single slot or slot pair. Inductors in the various slots somewhat counter the magnetic field produced by the series connected inductors in other slots, reducing the effective current flowing in the inductors, and thus reducing the efficiency of producing a magnetic field. However this reduction in magnetic field strength disproportionately effects harmonic magnetic fields, the net result being that harmonic rotating fields are reduced, reducing low speed torque pulsation and torque cusp, as well as making better use of stator cross section given the low number of phases.

FIG. 1$a$ (prior art) uses arrows to show the flux distribution in a stator incorporating distributed windings, and FIG. 1$b$ uses arrows to show the magnetic field strength in a stator incorporating concentrated windings. A concentrated winding generates a field distribution that is squared. Physically, the field H (theta) is evenly distributed as shown in FIG. 1$b$. In a distributed winding, the turns of the winding are distributed so that the resultant field distribution is sinusoidal in theta, as depicted in FIG. 1$a$.

FIG. 1$c$ shows the graph of a r=H$\theta$+baseline offset, the sinusoid which the distribution of the windings approximates as much as possible. The ideal approach is to distribute the turns according to the formula $dN/d\theta=(N/2)\sin\theta$. That is, the turn density in number of turns per radian must be approximately $(N/2)\sin\theta$. The highest turn density will be at $\pm\pi/2$. The result of the sinusoidal distribution is to cancel, to a very large degree, all spatial harmonics.

Spatial and Temporal Harmonics

Spatial harmonics are regular distortions in the magnetic field produced in the stator of a rotating machine. Spatial harmonics with a pole count greater than the pole count of the fundamental are filtered out and do not cause losses, if the windings of the stator are wound with a winding distribution according to the sinusoid function.

Temporal harmonics, which originate with the drive waveform, are currents within the drive waveform that cycle faster than the drive waveform. In a three phase machine, the magnetic fields that these harmonics produce, if they were to be viewed in isolation, would have the same number of poles as the fundamental, eg two poles in a two pole machine. This is because a three-phase machine does not fully sample the high frequencies of the temporal harmonics of the drive waveform. These temporal harmonics therefore would produce a magnetic field in a three phase stator, which seems to be similar in shape to the fundamental and yet rotates faster than the fundamental around the stator, and often in the reverse direction, depending on the specific harmonic involved. This magnetic field would not be filtered out by the windings being arranged in a sinusoidal distribution, since they form a magnetic field with the same number of poles as the fundamental, and the winding distribution function is only able to substantially affect magnetic fields of greater number of poles than the fundamental.

In a high phase order concentrated winding machine, all temporal harmonics with a harmonic number lower than the number of phases are properly sampled, and produce on the stator a multi-pole rotating magnetic fields rotating with the same frequency and in the same direction as the fundamental. These temporal harmonics, on the stator, directly become spatial harmonics. However, since they rotate at the same speed and direction as the fundamental, they are desirable spatial harmonics, representing greater efficiency by causing extra beneficial torque in the rotor.

Temporal harmonics with a higher harmonic number than the number of phases will not be properly represented on the stator, and will produce magnetic fields with a number of poles different from double their phase number. For example, in a 17 phase 2-pole machine, the $19^{th}$ harmonic would produce a 30-pole rotating field ($15^{th}$ harmonic of 2 pole) and in a 7 phase, 4 pole machine, the $9^{th}$ harmonic would produce a 20 pole rotating field ($5^{th}$ harmonic of 4 pole). In a 7 phase 2-pole machine, the $13^{th}$ harmonic would be a 2-pole rotating field. In the cases when the harmonic order exceeds the number of phases, the rotating field produced by this harmonic will not be properly represented. Instead a rotating field that is a non-corresponding harmonic of the fundamental rotating field will be produced. This field may rotate at a different direction from the fundamental and possibly in the reverse direction This is similar to temporal harmonics with a harmonic number greater than three in a three phase machine, in the fact that they represent detrimental torque. However, all the magnetic fields produced by these harmonics in the instances when the pole count is greater than the pole count of the fundamental, would be spatial harmonics of the fundamental, such as the $19^{th}$ harmonic in the 17 phase, 2 pole machine, which produces a 30 pole rotating field, and the $9^{th}$ harmonic in the 7 phase, 4 pole machine, which produces a 20 pole rotating field.

Temporal harmonics that are even or are multiples of the number of phases of the machine do not produce magnetic fields on the stator at all, due to symmetry and similar considerations.

Sampling and Reconstruction Filters

A bandwidth-limited continuous signal may be completely represented by a discrete series of samples, providing that this series of samples occurs frequently enough. The continuous signal may have an amplitude which changes over time, in which case the samples form a time series of measured amplitude versus integral time (e.g. 1 sample each second). The continuous signal may be an amplitude which changes with position, in which case the samples for a series of measured amplitude versus integral position, (e.g. 1 sample each meter). The period is arbitrary, and depends upon the signal being sampled. For baseband signals, the sampling frequency must be twice the maximum frequency present in the signal being sampled, otherwise aliasing may occur. Aliasing is when the signal being sampled contains frequency components that are outside of the allowed frequency range, in which case the results of sampling and reconstruction will be incorrectly produced, but allowed components.

Critical in the use of the sampling theorem is the use of the reconstruction filter. The reconstruction filter is a low pass filter that recreates the intermediate values of the original continuous signal using the data from the sample points. The winding of a motor is distributed according to a reconstruction filter. The rotating current structures, and thus the rotating magnetic filed structures are explicitly constrained by the form of the winding.

DISCLOSURE OF INVENTION

From the foregoing, it may be appreciated that a need has arisen for a more efficient rotating induction apparatus that filters out distortions such as spatial harmonics, but is nevertheless tolerant of desired low-order harmonics.

In one embodiment of the present invention an electrical rotating machine is connected with distributed windings, arranged according to the sinc function. In a related embodiment, the electrical rotating machine is connected with distributed windings arranged according to a cyclic analog of the sinc function.

In a further embodiment of the present invention, an electrical rotating machine is connected with distributed windings, arranged according to other low pass reconstruction filters.

It is an advantage of the present invention that an electrical rotating machine of more than three phases can be built that is able to use selected low order spatial harmonics but which filters out many higher order spatial harmonics.

It is an advantage of the present invention that an electrical rotating machine can have electrically variable impedance. When a high phase order machine is connected with a mesh connection to the inverter drive, then low-order harmonics added to the waveform can significantly change the impedance of the machine. At the same time, higher-order spatial harmonics that are less useful and often detrimental, are filtered out of the machine.

It is an advantage of the present invention that the same electrical rotating machine can be used for both high speed and traction applications.

It is an advantage of the present invention that the drive circuitry may be economically produced.

BRIEF DESCRIPTION OF DRAWINGS

For a more complete explanation of the present invention and the technical advantages thereof, reference is now made to the following description and the accompanying drawings, in which.

BEST MODE FOR CARRYING OUT THE INVENTION

Figure 1A:
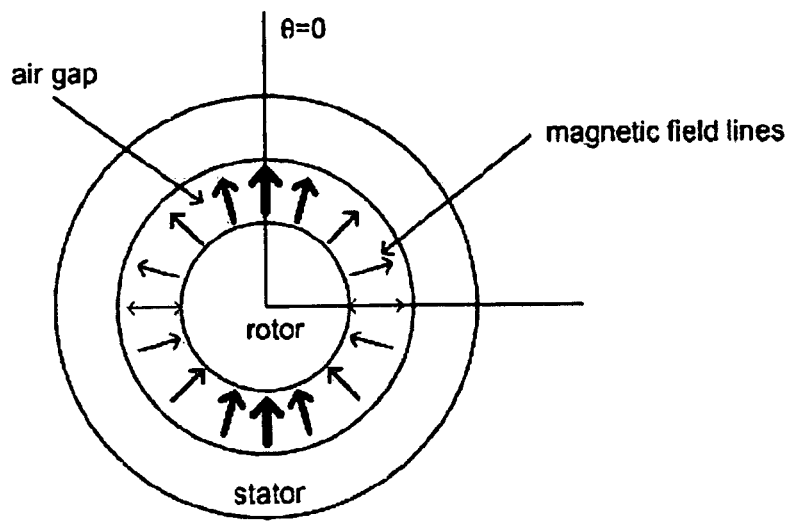
FIG. 1a shows a stator with concentrated windings (prior art).
Figure 1B:
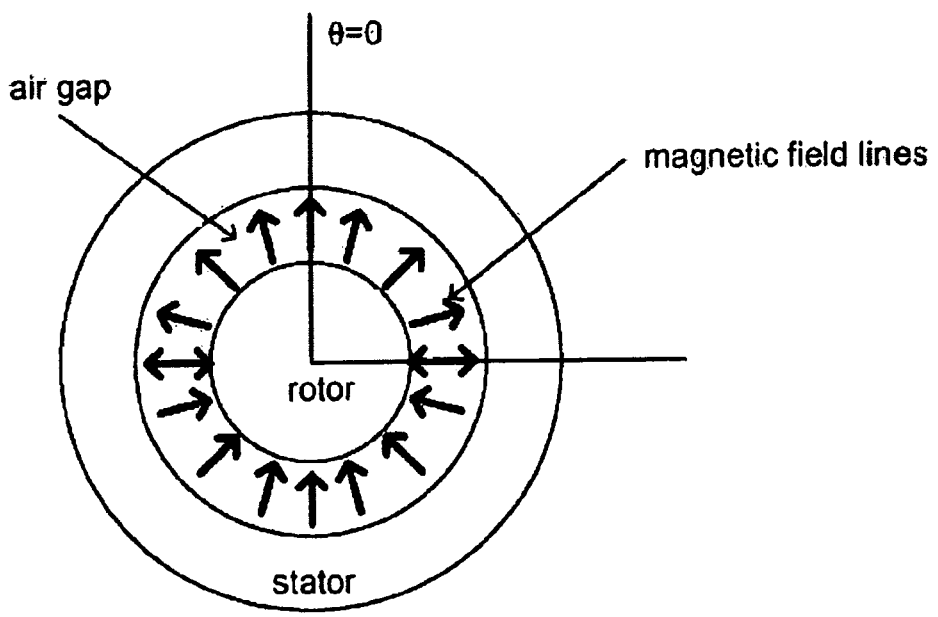
FIG. 1b shows a stator with distributed windings according to a sinusoidal distribution (prior art).
Figure 1C:
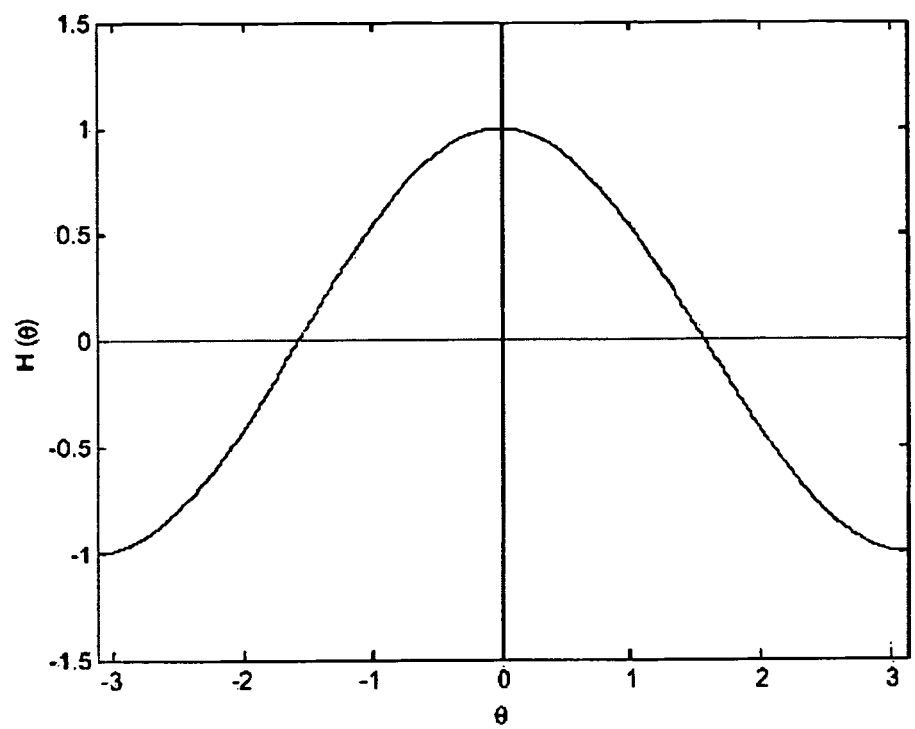
FIG. 1c shows a sinusoid, which the distributed windings of FIG. 1b. attempts to approximate.
Figure 2:
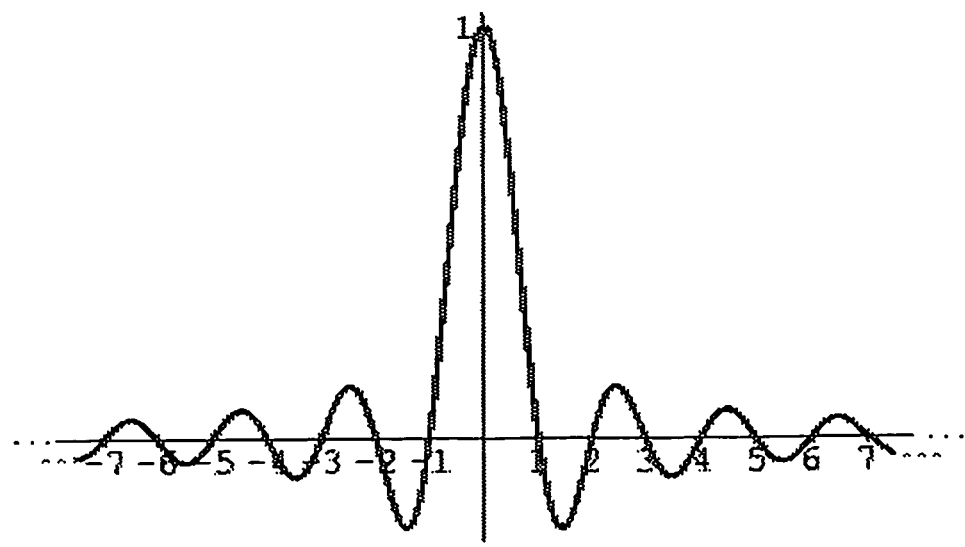
FIG. 2 shows a sinc function.
Figure 3:
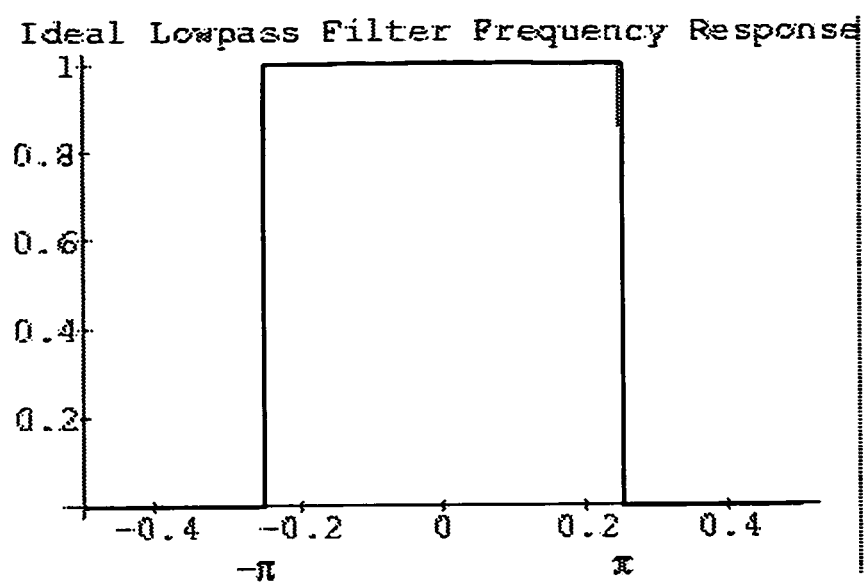
FIG. 3 shows the Ideal Lowpass Filter Frequency Response.
Figure 4:
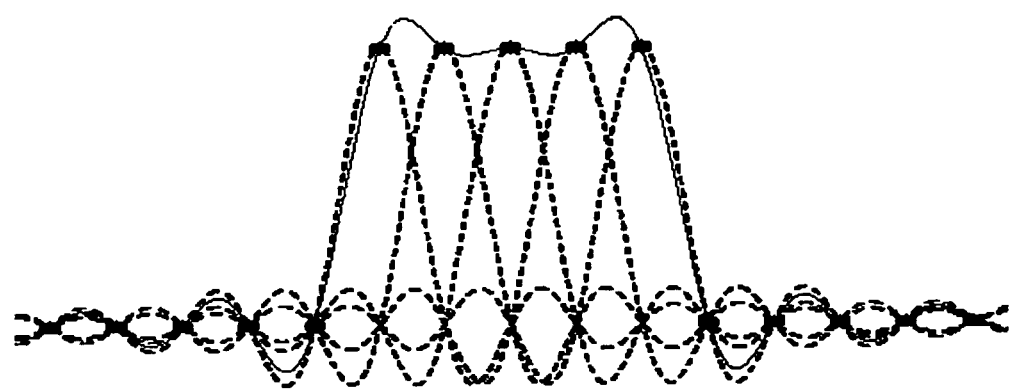
FIG. 4 shows a plurality of adjacent sinc functions linearly displayed.
Figure 5:
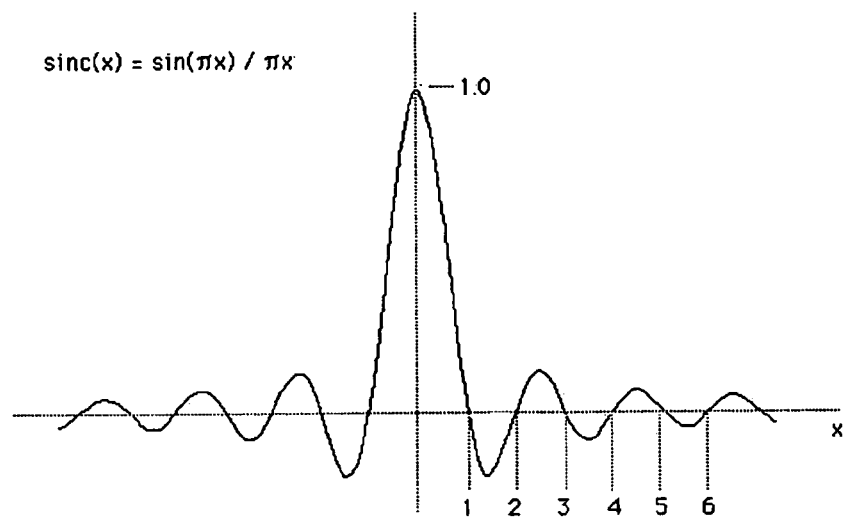
FIG. 5 shows the sinc function with a cutoff frequency of pi.
Figure 6:
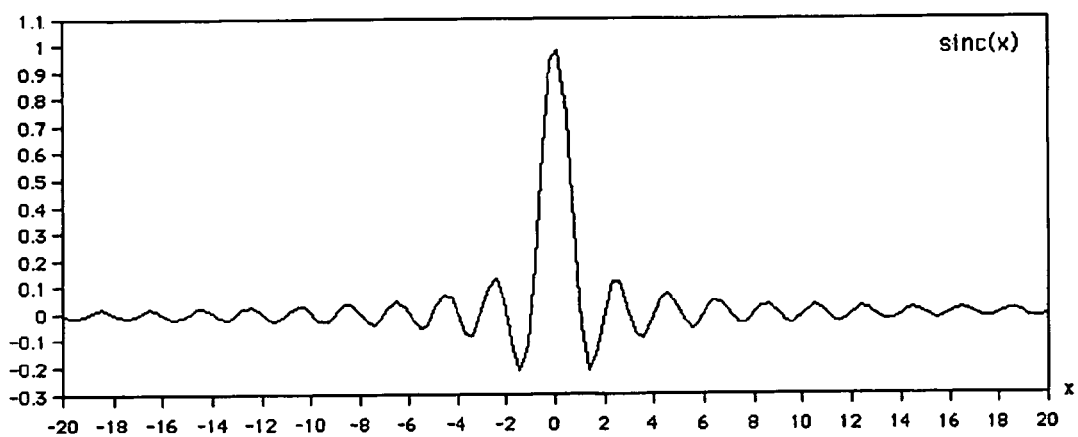
FIG. 6 shows a further graph of the sinc function.
Figure 7:
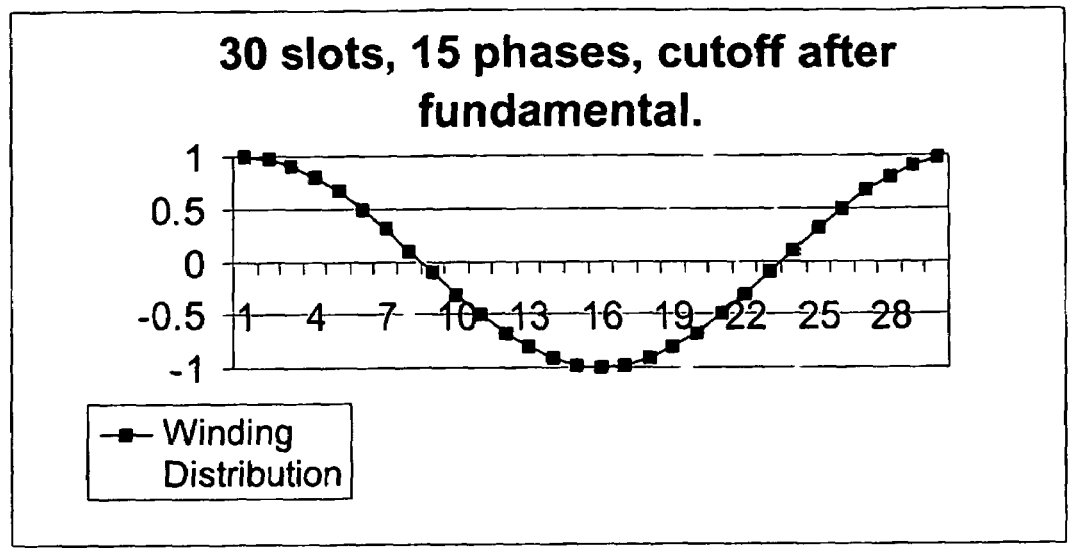
FIG. 7 shows the winding distribution according to the cyclic sinc function of a 30 slot machine, with a cutoff at the fundamental.
Figure 8:
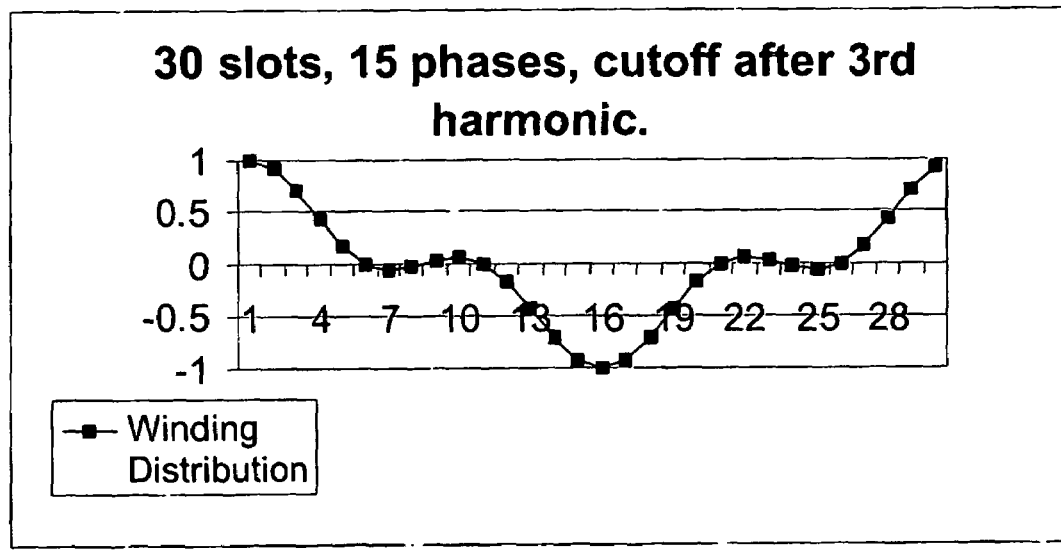
FIG. 8 shows the winding distribution according to the cyclic sinc function of a 30 slot machine, with a cutoff at the $3^{rd}$ harmonic.

The current flowing in the stator slots produces the rotating magnetic field of an electrical rotating machine. This current flow changes over time, causing the overall structure of the stator current distribution to change over time and rotate. In the ideal case, the stator current distribution is fixed in shape, but simply rotating. The various phases feeding the motor can be thought of as spatially sampling this current distribution, and the physically distributed turns of winding in the stator can be thought of as the necessary reconstruction filter. Each phase describes the current flowing at one location in each pole of the stator, and the winding distribution acts to smooth out this current flow appropriately.

Spatial harmonics, or air-gap harmonics, are harmonic fields generated by the non-sinusoidal nature of the field generated by each winding. When spatial harmonics are excited by the fundamental drive currents, they produce a secondary rotating field that rotates slower than the fundamental field. For a given excitation frequency, spatial harmonic fields rotate more slowly than the fundamental field.

Harmonic fields generated by non-sinusoidal drive waveforms are termed temporal harmonics. Rotating fields produced by temporal harmonic currents rotate more rapidly than the fundamental field. When temporal harmonics excite the fundamental spatial field, they produce a secondary rotating field that rotates more rapidly than the fundamental field and may rotate in the opposite direction to the fundamental field.

The idealized winding distribution used in three phase machines is the sinusoidal distribution, in which the number of inductors in each slot for each phase is proportional to the sine of the angle of that slot from a reference zero. Each phase has its own reference zero, and in a three-phase system the various phases are all 120 electrical degrees apart. In real windings, various greatly simplified windings are used, which variously use distributed sets of coils, each with the same number of turns, and short pitch coils, which do not reach to the next pole, in order to produce distributions of inductors which reasonably approximate the ideal sinusoidal distribution.

In the present invention, a high phase order induction machine, having more than three phases, is wound using distributed windings. Instead of using the sine function necessarily as the distribution function, a distribution function is selected so as to permit only the desired temporal harmonics to produce the rotating magnetic field. All other spatial harmonics (including those that originated as temporal harmonics), are canceled, or filtered out, or mitigated, as in the fashion of those spatial harmonics in the three-phase system with sinusoidal distributed windings.

The desired temporal harmonics are the fundamental and specific low order harmonics. For example, it may be desirable to use and even add third and fifth temporal harmonics in a high phase order machine, especially if the machine is mesh connected, as described below. Therefore these together with the fundamental would be the desired harmonics. All other spatial harmonics would be cancelled, eliminating both those that could produce useful torque such as those that originated as temporal harmonics, having a harmonic number lower than the number of phases, as well as all detrimental spatial harmonics greater than the fifth.

The desired reconstruction filter will thus be a low pass filter. The reconstruction filter is implemented by selecting the appropriate number of inductors in each slot that are connected electrically in series to form each phase. This number of inductors can be written as a function of desired cutoff frequency (C) and slot position (S). The simplest low pass filter used is the sinc function, well known in the field of digital audio where sampling is frequently used. The sinc function is simply sin(f*x)/(f*x), where f is the cutoff frequency, normalized so that with a cutoff frequency of 1, the first zero of the basic sinc function will be 90*N electrical degrees from the peak of the sinc function, where N is any integer.

For purposes of producing a suitable winding distribution, which must be confined to a finite stator, and must respect symmetries inherent in the actual windings themselves, the sinc function is modified by adding to it a negative version of itself, offset by 180 electrical degrees.

In order to calculate the cyclic function for use in determining the number of turns for each phase that should be placed in each slot, the following formula (in radians) is used:

Cyclic sinc(S)=Σ{−n+}, (sinc(C*y)−sinc(C*y−π))

where y=S+πn $$\text{Cyclic sinc}(S) = \sum_{n=-\infty}^{+\infty} \{\text{sinc}(C(S+2\pi n)) - \text{sinc}(C(S+2\pi n) - \pi)\}$$

where C is the cutoff harmonic, S is the slot angle in radians, from the reference zero of the phase, and n is an integer between from negative infinity and positive infinity.

This function would result in a distribution centered around the zero degrees slot. For each phase it should therefore be rotated around the stator by the phase angle (P). The phase angle P, in radians, would be 2π/((phases)*(poles)).

The results of the distribution for various slots would be scaled by the total number of effective series turns required by machine voltage and pole area, as is well known in three phase machines for dealing with distribution or chording.

Furthermore, in a conventional three phase distributed winding machine, the ideal sinusoidal distribution is approximated by practical physical windings which are constrained by issues such as requiring full coil turns in a winding, or the desire to use coils all of the same turn count. Similarly, in the present invention, the ideal low pass filter distribution functions may simply be approximated in a similar fashion.

One useful approximation would be to only consider the broad central region of the sinc function and distribute the windings for each phase only within this broad region (and its inverse, on the other side of the stator, while ignoring the other regions. In a second useful approximation one would not even consider the differences between the increments within the broad central region, treating the region with a sinusoidal distribution. In a third useful approximation the broad central region would be considered as a straight slope. In a fourth useful approximation, one would consider only the broad central positive region and the smaller negative lobes to either side of it, and of course, in all the approximations, also the inverses of these on the other side of the stator.

For the fourth useful approximation, a cyclic sinc winding distribution with a cutoff at the third harmonic is described. The trend of this sinc function may be determined as having two different degrees of increments, that of 4 units and that of 1 unit. Within the broad central lobe, the function starts with a slot containing zero turns of windings, then the number of turns increases by about 4 units per slot until the topmost region, then there is usually one slot containing an increment of 1 unit to reach the maximum number of turns, a single slot containing a decrement of 1 unit, and then the function decreases again with decrements of 4 units to reach a slot containing zero turns of winding again. The total number of slots containing windings in this broad central region is just under two thirds of the total number of slots per pole of the machine, for example, 11 in a 36 slot machine and 9 in a 30 slot machine. On each of the further sides of the two slots containing zero turns, there are two slots (or more, depending on the number of slots in the machine), with approximately the same number of turns in, one unit decrement below zero. The next slot once again contains zero turns.

In a further approximation, windings with the same total number of turns are positioned so that they approximate the ideal cyclic sinc function by having roughly the same total number of turns centered in each lobe of the function.

In the first approximation mentioned above, the 11 or 9 slots (adjusted for machines with different numbers of slots) of the broad central region, would be the only ones to contain windings for each phase. In the second approximation above the turns would be distributed sinusoidally throughout these slots, and in the third approximation there would be a gradient of increasing number of turns, reaching the maximum number of turns and then a declining gradient reaching zero turns again.

In one embodiment, the electrical rotating machine is a 5-phase machine. A (sin fx)/fx winding distribution is selected such that the winding of each phase has zero amplitude at the central point of each adjacent phase (in other words, the points on the stator where the winding distribution has zero turns are placed at multiples of 36 electrical degrees from the center of the pole/phase group (PPG)), producing a winding which has it's 'desired spatial cutoff frequency' at the 5th harmonic. The total number of series turns is selected using conventional distributed winding calculation techniques so as to provide a proper winding voltage at the desired flux density and drive frequency. In another way of describing the same idea, the cyclic sinc function described above is used, in which the cutoff frequency $C=5$ and for each slot angle S in radians from a reference point for each phase, the winding distribution of S is calculated using the formula $$\text{cyclic sinc }(S) = (\sin(5*(S+2\pi n)))/(5*(S+2\pi n)) - $$
$$(\sin(5*(S+2\pi n)-p))/(5*(S+2\pi n)-\pi)$$
$$= (\sin(5S+10\pi n)/(5S+10\pi n)) - $$
$$(\sin(5S+10\pi n-\pi)/(5S+10\pi n-\pi))$$

For each slot, the angle in radians S from a keystone physical angle on the stator may be substituted into the above equation, to produce a result from the above equation determining the number of turns that should ideally be placed in that slot. For example, if the number of turns of winding for a keystone slot itself were to be determined, $S=0$ and the result of the formula would be 1.

Figure 9:
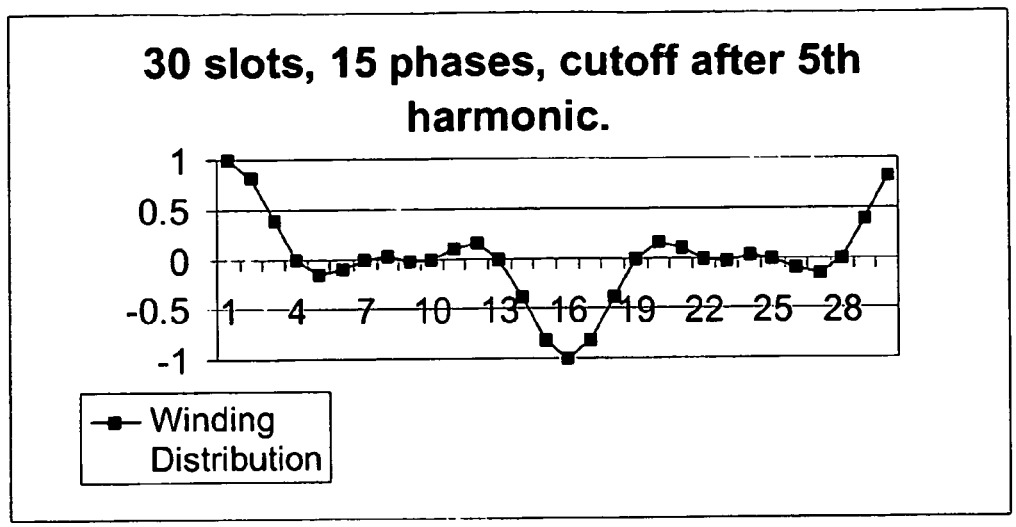
FIG. 9 shows the winding distribution according to the cyclic sinc function of a 30 slot machine, with a cutoff at the $5^{th}$ harmonic.

A graph of the number of winding turns in each slot of a 30 slot machine, may be seen in FIG. 9. Various other graphs of winding distributions in machines with different numbers of slots and with cutoff frequencies at different harmonics may be seen in FIGS. 7–16.

In another embodiment, a second possible winding configuration for the 5-phase machine is described. The cyclic sinc function described above is used with the cutoff harmonic C set to 4, for the fourth harmonic, to allow the third spatial harmonic to flow, but prevent the fifth and higher spatial harmonics from flowing. The fifth harmonic actually does not usually enter the five-phase machine, just as the third harmonic does not enter the three-phase machine. The fourth harmonic also does not normally flow, due to symmetry within the machine. However, if the cutoff harmonic were one that could enter the machine, it would be partially filtered and partially allowed to flow.

In another way of describing the same winding distribution, a sinc function (sin fx)/fx winding distribution is selected to place its zeros at multiples of 45 degrees from the center of the pole/phase group, creating a reconstruction filter with a cutoff at the fourth harmonic, passing the third harmonic without attenuation, but eliminating 7th and higher harmonic torque cusps. "Placing the zeros" of the sinc function at 45 degrees, is another way of saying that for 45 degrees in both directions, from a keystone angle on the stator for each phase, there is be a broad central region of gradually decreasing numbers of turns of windings. At 45 degrees away from the keystone slot, there would be no windings at all, and after that the number of turns of windings would increase again, but would be placed in the opposite direction going down the stator instead of up the stator. Theoretically, every 45 degrees the number of turns would again decline to zero, after which the direction of the windings would change, but in effect the function also takes into consideration the exact opposite configuration which must take place 180 degrees to the other side of the stator, and some of the turn increments and decrements would cancel one another out, which is why the cyclic sinc function described above would need to be used to determine more accurately the number of winding turns in each slot, or approximations therefore. Furthermore, there are a limited number of times 45 degrees away from a keystone slot appears on a stator.

In a further embodiment of the present invention, the third harmonic is injected into the motor at low speeds, thus appearing as a 6-pole rotating field in the nominally 2 pole motor frame. Furthermore, the windings of the motor are connected in a mesh connection, (as opposed to a star connection), and therefore the current seen within the winding can be much higher than the current injected from the drive. The drive, which has substantial low speed voltage available, but limited current, is thus able to provide much higher torques at low speeds than a motor which is not specifically fed a harmonic. The winding distribution would be a sinc function with a cutoff at the fourth or fifth harmonic, to allow the third spatial harmonic to pass, but not higher spatial harmonics. In a five-phase machine, the third temporal harmonic becomes the third spatial harmonic and would not be filtered out by this winding distribution.

Figure 10:
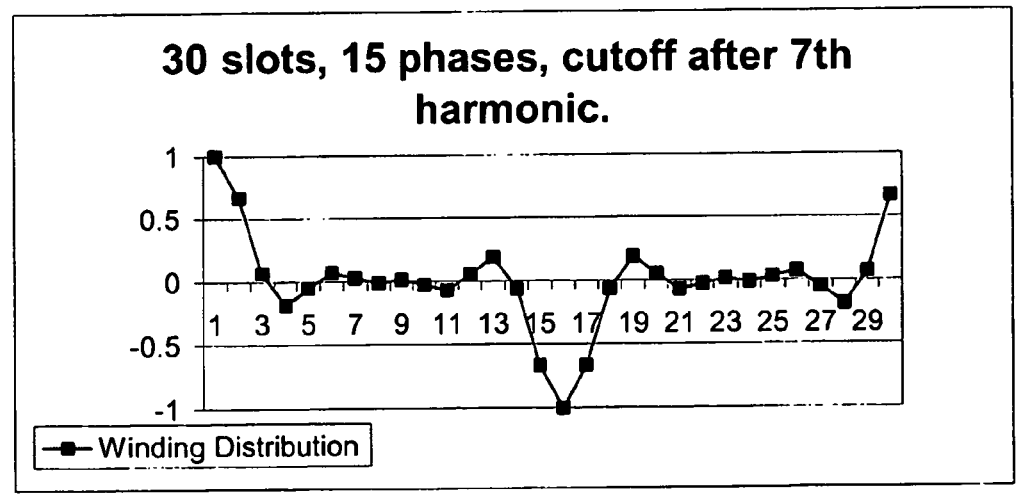
FIG. 10 shows the winding distribution according to the cyclic sinc function of a 30 slot machine, with a cutoff at the 7$^{th}$ harmonic.
Figure 11:
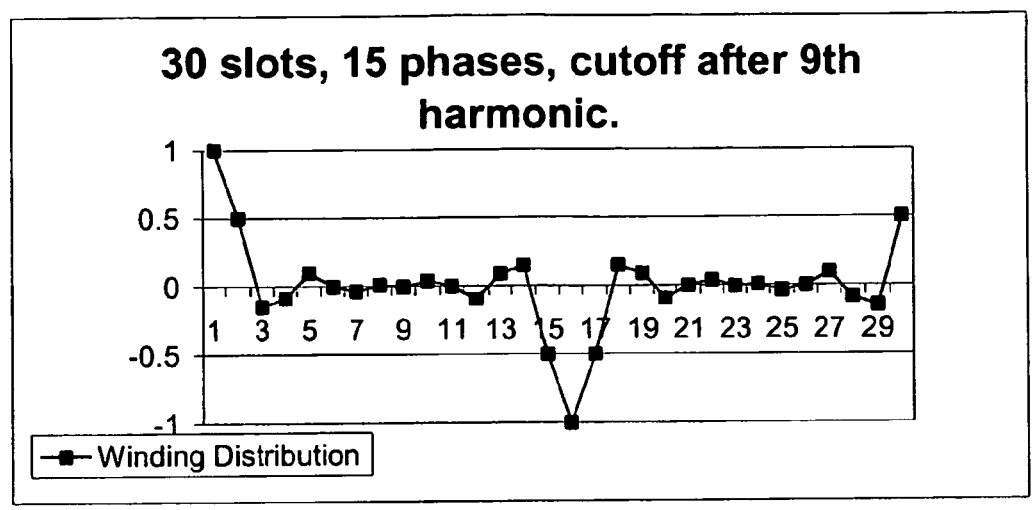
FIG. 11 shows the winding distribution according to the cyclic sinc function of a 30 slot machine, with a cutoff at the 9$^{th}$ harmonic.
Figure 12:
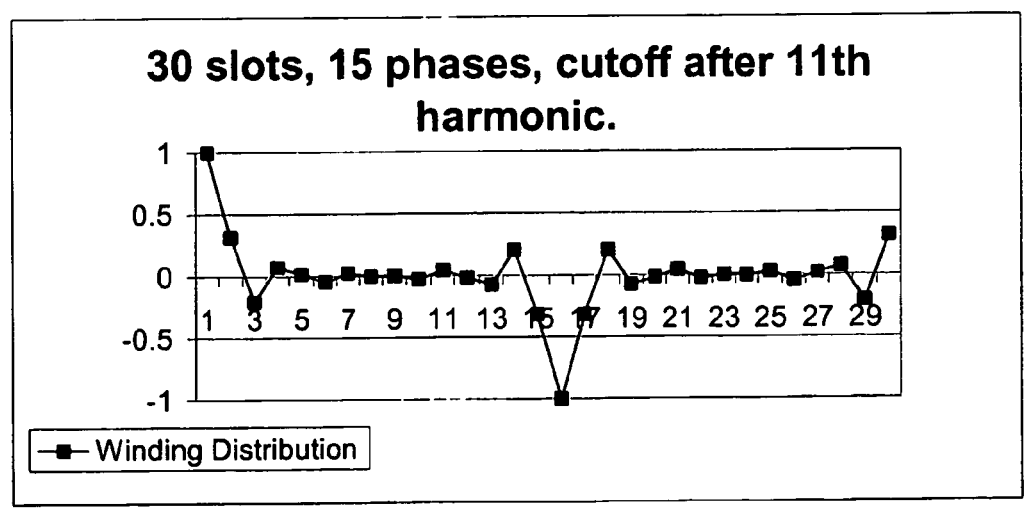
FIG. 12 shows the winding distribution according to the cyclic sinc function of a 30 slot machine, with a cutoff at the 11$^{th}$ harmonic.
Figure 13:
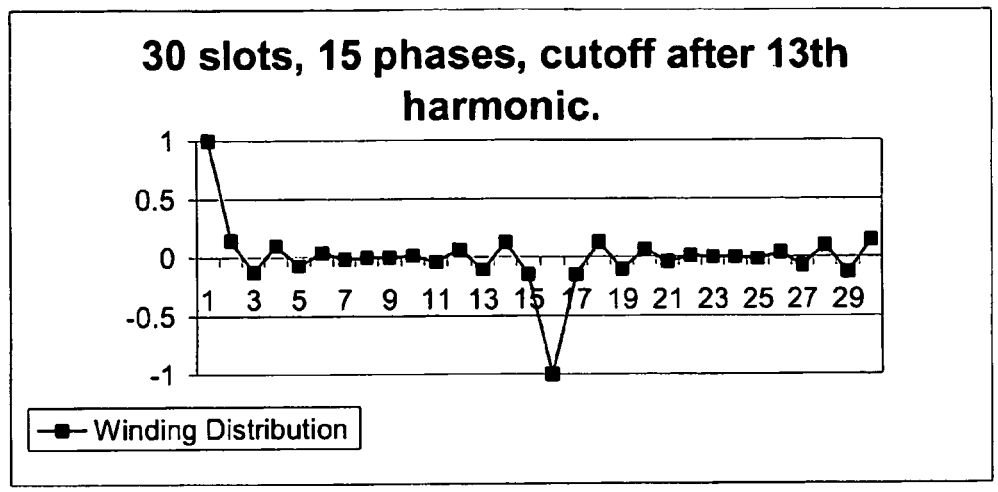
FIG. 13 shows the winding distribution according to the cyclic sinc function of a 30 slot machine, with a cutoff at the 13$^{th}$ harmonic.
Figure 14:
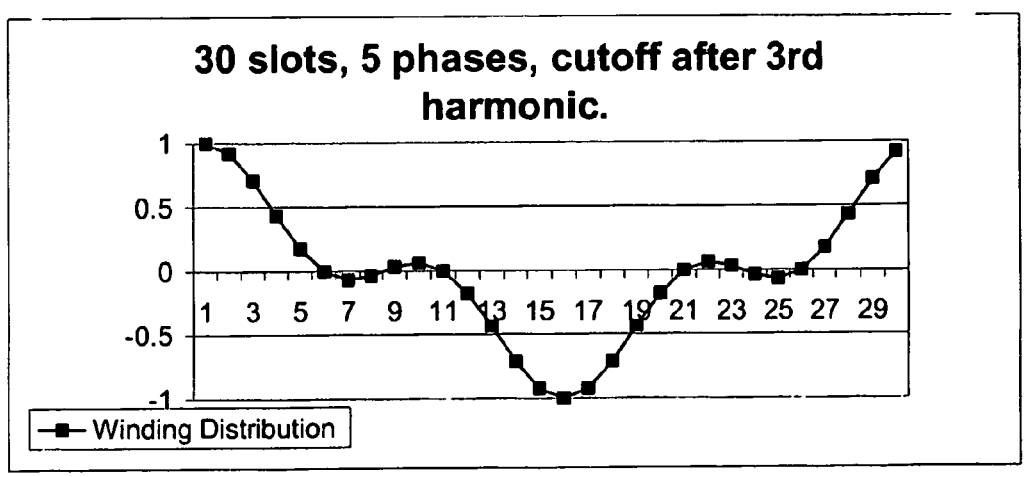
FIG. 14 shows the winding distribution according to the cyclic sinc function of a 30 slot machine, with a cutoff at the 3$^{rd}$ harmonic.
Figure 15:
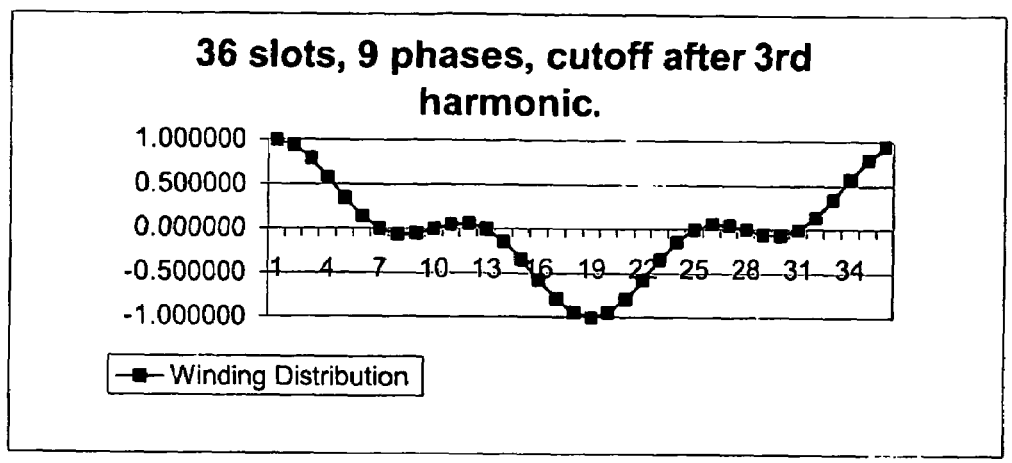
FIG. 15 shows the winding distribution according to the cyclic sinc function of a 36 slot machine, 9-phase machine, with a cutoff at the 3$^{rd}$ harmonic.
Figure 16:
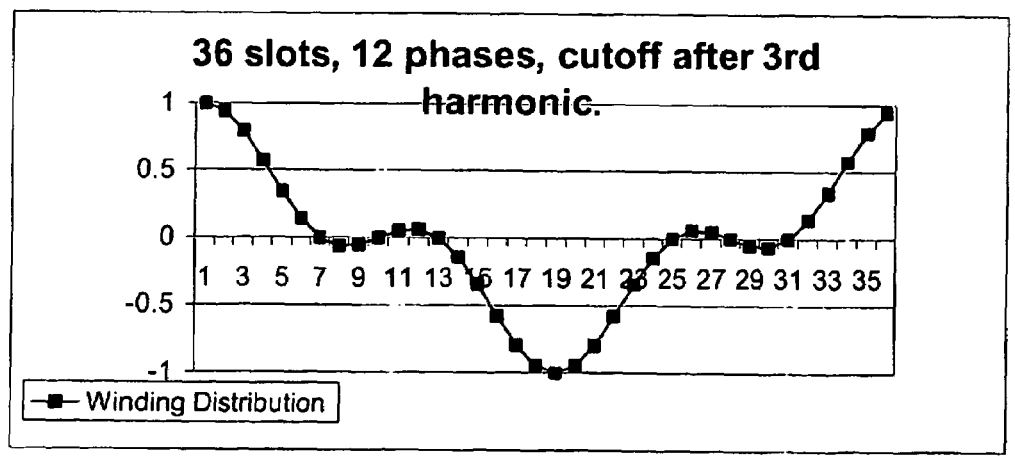
FIG. 16 shows the winding distribution according to the cyclic sinc function of a 36 slot machine, 12-phase machine, with a cutoff at the 3$^{rd}$ harmonic.

In a further embodiment of the present invention, a seven phase electrical rotating machine is used, and a low pass reconstruction filter is used to determine the winding distribution, with a function f(x) selected to allow the third and the fifth harmonics to be used in the machine, whilst filtering out higher order harmonics to a great extent. The low pass filter may be the sinc function, or other low pass filter capable of allowing substantially only the third and fifth harmonics to pass. A graph showing the distribution of the sinc function in a motor with a cutoff frequency at the seventh harmonic is shown in FIG. 10. The distribution of the windings is independent of the number of phases in the machine and depends only on the number of slots, except that it will be repeated according to the number of and positions of the phases, and may be scaled accordingly.

In a further embodiment, a nine phase electrical rotating machine is used, and a low pass reconstruction filter is used to determine the winding distribution, to filter out most harmonics and only allow entry to the machine of spatial harmonics below the ninth. This may be seen in FIG. xxx.

In a further embodiment, electrical rotating machines with higher phase counts are used, with a reconstruction filter used to determine the winding distribution to substantially filter out harmonics having a harmonic number lower than the number of phases. This may be seen in FIG. 13 with reference to a fifteen-phase machine, having a cutoff frequency at the thirteenth harmonic. However, it is desirable that electrical rotating machines with high phase counts should be used in machines with more than double the number of slots as phases, since for example in a 30 slot, 15 phase machine, the winding approximates a concentrated winding.

Figure 17:
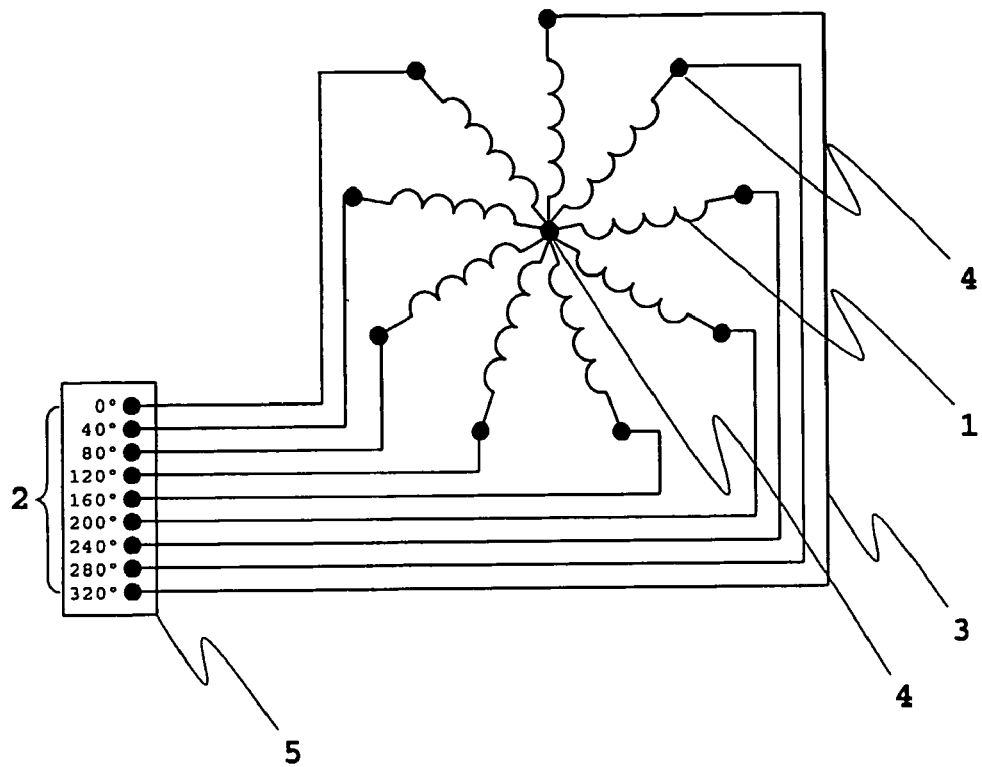
FIG. 17 shows a rotating electrical machine with more than three phases, (eight), star connected to an equal number of inverter terminals (represented by circles 5) providing multiple phases of drive waveform.
Figure 18:
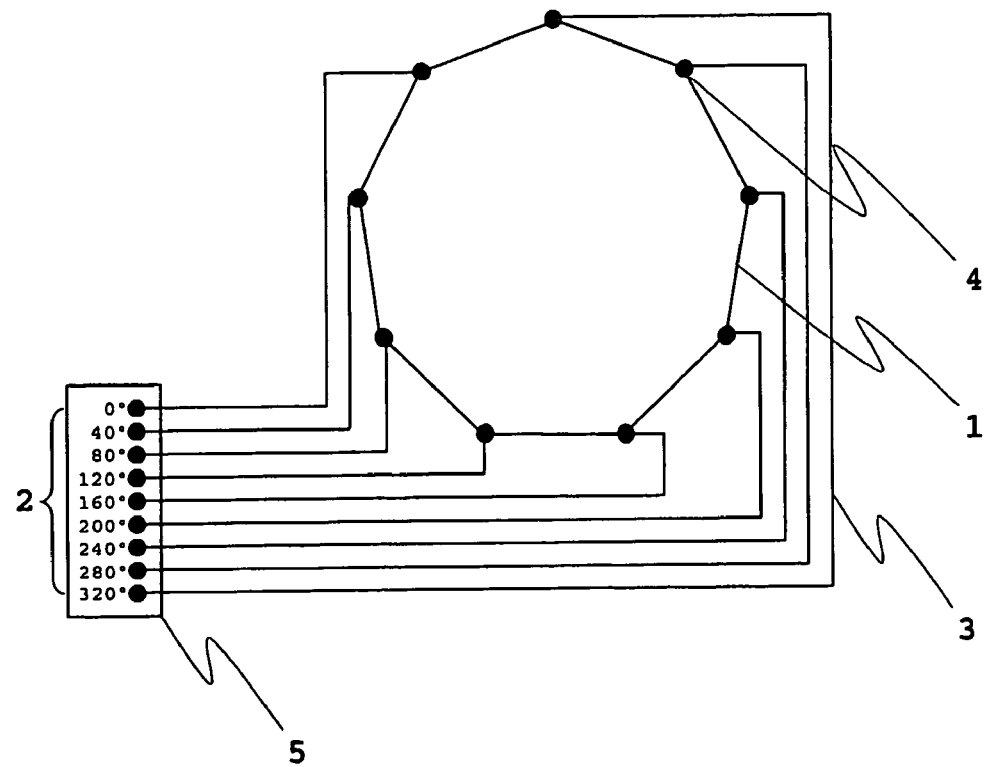
FIG. 18 shows a rotating electrical machine with more than three phases, (eight), mesh connected to an equal number of inverter terminals (represented by circles 5) providing multiple phases of drive waveform.

In a further embodiment, the electrical rotating machine is connected with a mesh connection to the inverter drive. In this way, the voltage across each winding is actually a function of the two different voltages placed at the two ends of the same winding, and thus may be substantially different from any of the voltages produced at that time by the inverter. Voltages may therefore be much higher in the windings than were actually generated by the inverter drive, and currents may be much lower, or alternatively, currents may be greatly increased whilst voltages are reduced. A mesh connection is depicted in FIG. 18. This example shows a mesh connection in which both ends of each motor phase winding are connected to adjacent inverter terminal outputs. In other words, it has a span value of L=1. However, the mesh may be arranged that both ends of each motor winding phase be connected to span a greater number of inverter terminal outputs. For example, if both ends of each motor winding phase would be connected to inverter terminals almost but not exactly 120 electrical degrees out of phase from each other, then the injection of third harmonic into the electrical current of the drive waveform would have a significant effect on the current to voltage ratio of the electrical rotating machine, and hence, on the torque and speed of the output of the electrical rotating machine. In a five phase machine, the L=2 connection connects each motor winding phase to inverter terminals 144 degrees apart. In contrast to a mesh connection, FIG. 17 shows an eight-phase machine connected to inverter terminals with a star connection.

In a further embodiment, the inverter logic may be configured to inject a pure harmonic drive waveform, for example, pure third or pure fifth harmonic. Due to the mesh connection, this pure harmonic drive waveform would significantly change the voltage across each winding, allowing very high voltages to be reached in the windings, or very high speeds. The mesh connection may be initially set up or switchable so that it creates a very large change in current/voltage ratios, when switched between fundamental and an injection of pure third harmonic or pure fifth harmonic drive waveform.

In a further embodiment, a harmonic can be supplied to the electrical rotating machine simultaneously to a fundamental pole count drive waveform. In one embodiment, a fundamental drive waveform employs a two-pole rotating field. Superimposed to a selective degree to this can be the third harmonic. This effectively changes the voltage across the winding, and the currents going through the machine. Therefore, the addition of harmonics in this way, may electrically vary the impedance of the machine.

Certain mesh connections, such as those in which the two ends of each winding are connected to two inverter outputs with an electrical angle difference of approximately but not exactly 120 electrical degrees, are able to take particular advantage of the injection of third harmonic, to produce large changes in impedance.

In a further embodiment, fifth harmonic may be injected into the drive waveform, to further provide impedance variation. The fifth harmonic may be used simultaneously or separately from the third harmonic, and may be superimposed onto or used instead of the fundamental. In addition, the mesh connection used may be one that uses fifth harmonic to the best advantage, as detailed in my other patent application.

In a further embodiment, a winding distribution may be set up that allows many low-order harmonics, those below the phase count, to all flow in the machine, such as a 15 phase machine with a cutoff frequency at the thirteenth harmonic. These low-order harmonics may be selectively added to provide further or alternative variance in impedance.

It will be understood that various control logic circuitry, well known in the art, may be employed to determine when extra voltage or extra current is required from the machine. These control logic circuitry components would be connected to automatically add or eliminate extra harmonics according to these requirements. This would have the effect of temporarily boosting voltage across each winding whilst reducing the maximum current able to flow through the windings, or temporarily boosting the current through the windings whilst reducing the maximum voltage possible across the windings. The voltage across the windings is directly related to the output speed of the machine and the currents through the windings are directly related to the output torque of the machine.

A user input may also be incorporated to allow manual control over the current/voltage ratio. This is also known as the impedance of the machine.

In a further embodiment, the mesh connection is specifically designed to make the best use of the low order harmonics that are able to flow in the electrical rotating machine. This is described in great detail in my U.S. Pat. No. 6,657,334. Usually, the third harmonic is able to produce the greatest variability between currents and voltages across windings.

A preferred embodiment uses a five phase machine, with a sinc function filter used to describe a distribution that allows third harmonic to flow in the machine whilst filtering out all other harmonics, having a cutoff frequency C set to 4. The five phases comprise a mesh connection with the two ends of each winding connected to inverter terminals 144 electrical degrees apart, in other words, having a span of L=2. The inverter drive supplies fundamental waveform current with a variable amount of added third harmonic component.

The invention claimed is:

1. A high phase order rotating induction machine, comprising a stator having windings for each of said phases, the number of phases is greater than three, a number of inductors is a function of desired cutoff frequency and slot position, said windings are distributed according to a sinc function or an approximation of a sinc function:

sinc=sin(f*x)/(f*x)

where sinc is the cutoff harmonic, and f is the cutoff frequency, normalized so that at a cut of frequency of 1, the first zero of the sinc function will be 90*N electrical degrees from peak of the sinc function, where N is any integer between negative infinity and positive infinity, such that a suitable winding distribution is formed centered around a zero degree reference slot.

2. The rotating induction machine of claim 1 wherein said windings are distributed according to an approximation of a sine function.

3. The rotating induction machine of claim 2 wherein said sine function has a cutoff frequency at a fourth or a fifth harmonic.

4. The rotating induction machine of claim 2 wherein the number of phases is five and wherein said sine function has a cutoff frequency at a third spatial harmonic.

5. The rotating induction machine of claim 4 further comprising a high phase inverter drive, wherein the number of phases is the same as the number of phases of said rotating induction machine, electrically connected to said windings, wherein said windings are connected to said inverter drive wit a mesh connection.

6. The rotating induction machine of claim 5 wherein said inverter drive is capable of selectively injecting third harmonic into a drive waveform, and wherein said mesh connection has a span of L=2.

7. A high phase order rotating induction machine, comprising a stator having windings for each of said phases, the number of chases is greater than three, said windings are distributed according to a cyclic sinc function or an approximation of a cyclic sinc function:

$$\text{cyclic sinc}(S) = \sum_{n=-\infty}^{+\infty} \{\text{sinc}(C(S + 2\pi n)) - \text{sinc}(C(S + 2\pi n) - \pi)\}$$

where C is the cutoff harmonic, S is the slot angle in radians, from the reference zero of the phase, and n is an integer between from negative infinity and positive infinity, such that a suitable winding distribution is formed centered around a zero degree reference slot.

8. The rotating induction machine of claim 7 wherein said windings are distributed according to an approximation of a cyclic sinc function.

9. The rotating induction machine of claim 8 wherein said cyclic function has a cutoff frequency to pass low-order harmonics and to substantially filter out all higher harmonics.

10. The rotating induction machine of claim 8 wherein said windings are distributed to give a fixed number of turns positioned in the center of each lobe of the cyclic sinc function.

11. The rotating induction machine of claim 10 wherein said cyclic function has a cutoff frequency to pass low order harmonics and to substantially filter out high-order harmonics.

12. The rotating induction machine of claim 8 additionally comprising groups of winding positioned in a single lobe on either side of said central lobe.

13. The rotating induction machine of claim 8 wherein said cyclic sinc function has a cutoff frequency at the fourth or the fifth harmonic.

14. The rotating induction machine of claim 8 wherein the number of phases is five and wherein said sine function has a cutoff frequency at a third spatial harmonic.

15. The rotating induction machine of claim 14 further comprising a high phase inverter drive, wherein the number of phases is the same as the number of phases of said rotating induction machine, electrically connected to said windings, wherein said windings are connected to said inverter drive with a mesh connection.

16. The rotating induction machine of claim 14 wherein said mesh connection has a span of L=2.

17. The rotating induction machine of claim 8 further comprising a high phase inverter drive, wherein the number of phases is the same as the number of phases of said rotating induction machine, electrically connected to said windings, wherein said windings are connected to said inverter drive with a mesh connection and wherein said inverter drive is capable of selectively injecting low order harmonics into a drive waveform.

18. The rotating induction machine of claim 17 wherein said cyclic sine function has a cutoff frequency to pass said low order harmonics only.

19. The rotating induction machine of claim 8 wherein said windings are distributed for each phase to approximate only the broad central regions of the cyclic sine function, ignoring the side lobes of the cyclic sine function.

20. The rotating induction machine of claim 19 wherein within said broad central region said windings are distributed to approximate a sine function.

21. The rotating induction machine of claim 19 wherein within said broad central region said windings are distributed to approximate the cyclic sinc function with a gradient of increasing number of turns up to a maximum value.

* * * * *